Patented July 1, 1930

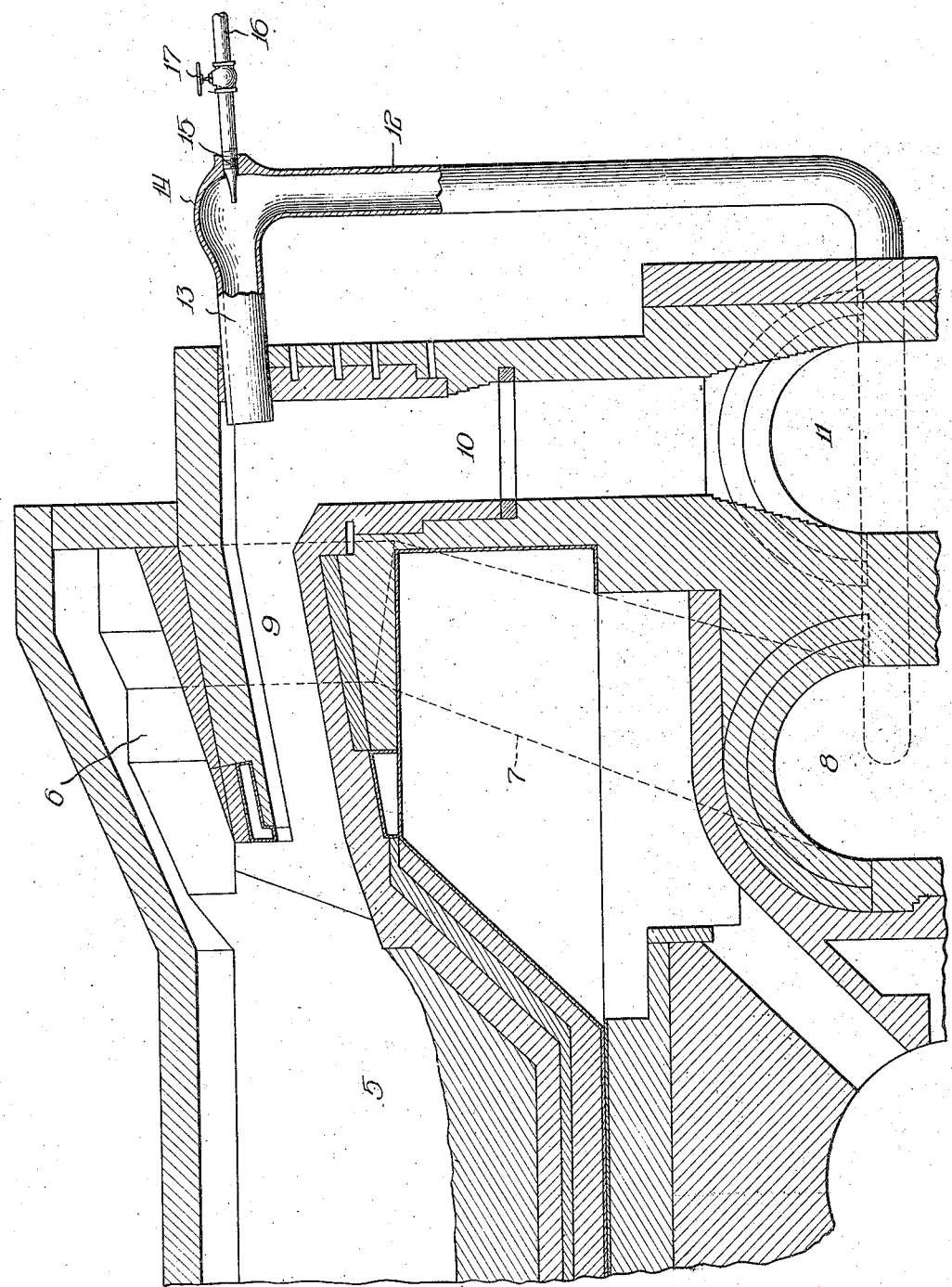

1,769,220

UNITED STATES PATENT OFFICE

ALEXANDER M. GOW, OF DULUTH, MINNESOTA; AMERICAN EXCHANGE NATIONAL BANK OF DULUTH EXECUTOR OF THE SAID ALEXANDER M. GOW, DECEASED

FURNACE

Application filed June 17, 1921. Serial No. 478,261.

This invention relates to gas-fired furnaces and methods of operation of such furnaces. More particularly it relates to means and methods for producing a better admixture of the air and gas with better combustion and higher flame temperature.

It is the usual practice in furnaces of this character to admit the gas and air intermittently at the opposite ends of the furnace, and for structural reasons, and because of the large volumes which it is necessary to supply and carry off, the ports through which the gas and air enter are relatively large at the points where they join the melting chamber. Obviously while a certain amount of intermixture and combustion takes place immediately upon the entry of the air and gas into the melting chamber, a considerable amount of time is involved before the streams of gas and air are sufficiently intermingled to secure complete combustion.

More efficient operation of the furnace could be secured if the air and gas could be more thoroughly mixed prior to or upon their entrance into the melting chamber. In furnaces using producer gas, inasmuch as this gas consists mainly of hydrogen and carbonic oxide, fairly rapid combustion can be obtained. However, when heavier gases such as coke oven gas or natural gas are used, these gases cannot be passed through the usual checker chambers on account of the deposition of carbon therein and hence cannot be adequately preheated. A considerable element of time is involved, therefore, in breaking these gases into their constituents, free carbon and hydrogen. This breaking down must be accomplished before complete combustion can be secured. If, however, means can be provided for heating these gases before they enter the melting chamber, the breaking down process can take place earlier and combustion can be secured immediately upon their entrance into the chamber.
It is an object of the present invention to provide means whereby the air and gas may be more adequately and rapidly mixed and whereby such mixture may take place before entrance into the melting chamber.
It is a further object to provide a system whereby the gas may be heated before meeting the main stream of air in the furnace.

It is an additional object to provide a method of furnace operation adapted to secure these several results.

Other and further objects will appear as the description proceeds.

My invention comprises the introduction of a volume of heated air into the gas stream before it enters the melting chamber. This volume of heated gas is not sufficient to secure complete combustion but to secure a preliminary partial combustion. This auxiliary stream of air is provided with controlling means whereby its velocity and quantity may be varied as desired.

In the case of producer gas the gas enters the melting chamber at an augmented temperature due to the preliminary combustion, so that no delay results in the complete combustion and the flame begins immediately adjacent the incoming ports. In the case of coke oven gas and natural gas, the introduction of this auxiliary stream of heated air serves to so raise the temperature as to begin the breaking down of the gases into their combustible constituents.

In this construction there is no chamber permitting the deposit of the carbon, which is carried directly into the melting chamber by the gas and air flow. My auxiliary air stream does not do away with or interfere with the usual air flow adjacent the furnace roof from the usual air uptakes. I am aware that it has heretofore been proposed to provide an auxiliary stream of air by means of a fan, the stream being discharged into the gas passages. The use of a fan in air which is of a temperature of 2000 degrees F. or more presents many mechanical difficulties and would of necessity have to be air cooled, which would involve a certain loss in temperature. According to my construction this air current is moved by means of an ejector consisting of an air nozzle introducing air at relatively high pressure—for example, of 100 pounds the square inch, but in very small volume. This air, while it will be relatively cooler than the auxiliary air supply, may nevertheless be raised somewhat in temperature, and further, this volume is so small relative to the main body of air that it involves but slight losses in temperature. These losses will probably be no greater than those occasioned by a water cooled fan and the installation is much simpler and involves no mechanical difficulties.

I have illustrated a preferred embodiment in the accompanying drawings, the single figure of which shows the port end of an open hearth furnace equipped with my invention. The furnace comprises the melting chamber 5, air port 6, air uptakes 7, air slag pocket 8. It further comprises the gas port 9, gas uptake 10, gas slag pocket 11. The auxiliary air passage 12 leads from the air slag pocket 8 to the gas uptake 10 at its junction with the gas port 9. This passage 12 has its portion 13 which enters the gas uptake substantially in alignment with the gas port. The portion 14 of the auxiliary air passage is somewhat enlarged and receives the air ejector nozzle 15. This nozzle 15 is connected to the air pipe 16 and the air supply is controlled by the valve 17.

When using the end of the furnace for the incoming air and gas, the usual main body of air comes through the slag pocket 8 and though the uptakes 7 to the air port 6 and thence into the melting chamber 5. The gas comes up through the slag pocket 11 and uptake 10 to the gas port 9 and mingles with the air upon leaving that port. The auxiliary supply of air passes through the passage 12 and out through its portion 13 into the gas uptake in substantial alignment with the gas port. The relatively small stream of compressed air leaving the nozzle 15 acts as an ejector and draws with it and carries ahead of it the auxiliary stream of preheated air. While the preheated air has been shown as taken from the air slag pocket, it is obviously immaterial as to just what point in the heated air passages the air is taken from. The auxiliary air supply may be accurately controlled by controlling the supply of air to the ejector nozzle.

My invention comprises a construction which is extremely simple and involves no mechanical difficulties. It is furthermore easily capable of adjustment and control.

I claim:

1. In an open hearth furnace or the like having main air and gas passages and ports, an auxiliary air passage leading from the main air passage to the gas passage, and a source of compressed air connected to a discharge nozzle directed into said auxiliary air passage, said auxiliary air passage entering the gas passage adjacent the gas port and the compressed air nozzle entering said auxiliary passage adjacent its entrance into the gas passage.

2. In an open hearth furnace or the like having main air and gas passages and ports, an auxiliary air passage leading from the main air passage to the gas passage, and a source of compressed air connected to a discharge nozzle directed into said auxiliary air passage, said auxiliary air passage entering the gas passage adjacent its entrance into the gas port and being directed toward said port, said nozzle serving as an ejector and drawing the air through the auxiliary passage and into said gas passage.

3. In an open hearth furnace or the like having air slag pockets, uptakes and ports, and gas uptakes and ports, an auxiliary air passage leading from the air slag pocket to the gas uptake, said auxiliary passage entering the gas uptake adjacent the gas port and in substantial alignment therewith, and a compressed air ejector nozzle entering the auxiliary passage adjacent its entrance into the gas uptake.

4. In an open hearth furnace or the like having air slag pockets, uptakes and ports, and gas uptakes and ports, an auxiliary air passage leading from the air slag pocket to the gas uptake, said auxiliary passage entering the gas uptake adjacent the gas port and in substantial alignment therewith, and a compressed air ejector nozzle entering the auxiliary passage adjacent its entrance into the gas uptake, said nozzle being directed toward said port and serving to draw the air through the auxiliary passage and into the gas uptake and gas port.

5. A regenerative open hearth furnace having a combined air and gas port and air ports at each end thereof, air flues communicating with said air ports, gas flues communicating with said combined air and gas ports, air ducts at each end of said furnace communicating with said air flues and combined air and gas ports so as to allow air from said air flues to pass into said combined air and gas ports, blowers in said air ducts to the rear of said gas ports, said blowers being adapted to have a flow of fluid under pressure therethrough so as to eject the mixture of air and gas from said combined air and gas ports, and means for regulating the flow of fluid through said blowers.

6. In a regenerative furnace including in its structure a furnace chamber provided with air and gas ports, air and gas regenerators, passageways opening between regenerators and ports and interconnecting ducts between air and gas passageways, the method of operation herein described which consists in maintaining flow from regenerators to furnace chamber at one end and from furnace chamber to regenerators at the other end, and at the same time projecting in the interconnecting duct at the intake end of the furnace a jet of fluid.

7. In a regenerative furnace including in its structure a furnace chamber provided with air and gas ports, air and gas regenerators, passageways opening between regenerators and ports and interconnecting ducts between air and gas passageways, the method of operation herein described which consists in maintaining flow from regenerators to furnace chamber at one end and from furnace chamber to regenerators at the other end, and at the same time projecting in the interconnecting duct at the intake end of the furnace a jet of fluid and varying the intensity of said jet.

Signed at Duluth, Minnesota, this 13th day of June, 1921.

ALEXANDER M. GOW.